(12) United States Patent
Tsuji (10) Patent No.: US 8,548,732 B2
(45) Date of Patent: Oct. 1, 2013

(54) NAVIGATION SYSTEM FOR VEHICLE (75) Inventor: Kenji Tsuji, Gifu (JP)

(73) Assignee: DENSO CORPORATION, Kariya (JP)

( * ) Notice: Subject to any disclaimer, the term of this patent is extended or adjusted under 35 U.S.C. 154(b) by 786 days.

(21) Appl. No.: 12/219,006

(22) Filed: Jul. 15, 2008

(65) Prior Publication Data

US 2009/0024319 A1    Jan. 22, 2009

(30) Foreign Application Priority Data

Jul. 17, 2007   (JP) ................. 2007-186163

(51) Int. Cl.
*G01C 21/00* (2006.01)
*G08G 1/123* (2006.01)

(52) U.S. Cl.
USPC ........... 701/409; 701/400; 701/408; 701/454; 701/540; 340/995.1; 340/995.17; 340/995.26; 340/995.27

(58) Field of Classification Search
USPC ............... 701/200, 208, 209, 211, 212, 400, 701/408, 409, 410, 450, 454, 461, 532, 540; 340/995.1, 995.17, 995.14, 995.19, 995.2, 340/995.24–995.27, 815.78; 345/581, 582, 345/672; 715/854, 855, 968, 716, 864, 818
See application file for complete search history.

(56) References Cited

U.S. PATENT DOCUMENTS

| | | | | |
|---|---|---|---|---|
| 4,914,605 A * | 4/1990 | Loughmiller et al. | ........ | 345/649 |
| 5,297,051 A * | 3/1994 | Arakawa et al. | .............. | 701/200 |
| 5,430,655 A * | 7/1995 | Adachi | .......................... | 701/209 |
| 5,754,430 A * | 5/1998 | Sawada | .......................... | 701/209 |
| 5,778,333 A * | 7/1998 | Koizumi et al. | .............. | 701/212 |
| 6,188,956 B1 * | 2/2001 | Walters | .......................... | 701/200 |
| 6,424,933 B1 | 7/2002 | Agrawala et al. | | |
| 6,565,610 B1 * | 5/2003 | Wang et al. | .................. | 715/210 |
| 6,952,661 B2 | 10/2005 | Agrawala et al. | | |
| 7,076,409 B2 | 7/2006 | Agrawala et al. | | |
| 7,231,297 B2 * | 6/2007 | Sumizawa et al. | ............ | 701/211 |
| 7,304,653 B2 * | 12/2007 | Ueno | ............................ | 345/649 |

(Continued)

FOREIGN PATENT DOCUMENTS

| | | |
|---|---|---|
| JP | A-05-197334 | 8/1993 |
| JP | A-2005-300168 | 10/2005 |

OTHER PUBLICATIONS

Extended European Search Report mailed on May 2, 2011 in the corresponding European Patent Application No. 08011457.2.

(Continued)

*Primary Examiner* — Rami Khatib
(74) *Attorney, Agent, or Firm* — Posz Law Group, PLC (57) ABSTRACT

A travel-estimated road, which a vehicle is estimated to travel, intersects with a cross road at an intersection. A search area shaped of a sector centering on the intersection is defined to have a central angle to include an extending direction of the cross road. An arc intersecting point is then defined where an outer circumference arc of the search area intersects with the cross road. A display position of the road name of the cross road on a road map is determined based on a line segment between the intersection and the arc intersecting point. Thus, the road name of the cross road can be displayed in a position, which is in proximity to the travel-estimated road so as to allow a user to clearly recognize that the displayed road name indicates the cross road irrespective of the configuration of the cross road.

21 Claims, 8 Drawing Sheets

(56) References Cited

U.S. PATENT DOCUMENTS

| | | | |
|---|---|---|---|
| 7,330,787 B2 | 2/2008 | Agrawala et al. | |
| 7,430,473 B2* | 9/2008 | Foo et al. | 701/212 |
| 7,490,004 B2* | 2/2009 | Kimura | 701/201 |
| 7,496,484 B2 | 2/2009 | Agrawala et al. | |
| 7,542,882 B2 | 6/2009 | Agrawala et al. | |
| 7,565,241 B2* | 7/2009 | Tauchi | 701/208 |
| 7,636,634 B2* | 12/2009 | Sumizawa et al. | 701/211 |
| 7,693,658 B2* | 4/2010 | Nomura | 701/211 |
| 2005/0052413 A1 | 3/2005 | Ueno | |
| 2005/0143914 A1* | 6/2005 | Yamada et al. | 701/211 |
| 2006/0195255 A1* | 8/2006 | Kim | 701/208 |
| 2007/0021911 A1 | 1/2007 | Kikuchi et al. | |
| 2008/0097692 A1 | 4/2008 | Fukumoto et al. | |

OTHER PUBLICATIONS

Examination Report dated Dec. 29, 2011 in corresponding EP Application No. 08011457.2.

* cited by examiner

NAVIGATION SYSTEM FOR VEHICLE

CROSS REFERENCE TO RELATED APPLICATION

This application is based on and incorporates herein by reference Japanese Patent Application No. 2007-186163 filed on Jul. 17, 2007.

FIELD OF THE INVENTION

The present invention relates to a navigation system for a vehicle.

BACKGROUND OF THE INVENTION

A conventional in-vehicle navigation system displays, on a road map, characters such as: address names or administrative district names including names of prefectures, cities, and towns; facility names including park names; and road names. Users can thus acquire information on names to specify an area where the vehicle runs, peripheral facilities, and relevant roads. Herein, display positions of such information on names are predetermined in road map data; thus, each name is displayed at a corresponding predetermined position on a road map.

The address names or facility names are generally necessary for a user to confirm a place the vehicle runs. A user determines an approximate route to a desired destination, and thereby drives a vehicle. The names of relevant roads are therefore more important than those of addresses or facilities for such a user. This is because the user determines one by one which road to run along the approximate route based on road names in many cases.

However, the necessity that the user understands all the road names displayed in the navigation system is low. That is, the user can drive the vehicle along the previously determined route as long as the user can know the road subsequent to the present road the vehicle is running.

SUMMARY OF THE INVENTION

It is an object of the present invention to provide a navigation system capable of displaying a road name intelligibly for a user to easily determine which road the user should proceed to.

According to an example of the present invention, a navigation system for a vehicle is provided as follows. A displaying means is configured to have a display screen. A detecting means is configured to detect a present position and a heading direction of the vehicle. A storing means is configured to store road map data for displaying a road map including a road name of a road. A display managing means is configured to read road map data from the storing means based on the detected present position, and display a peripheral road map and a vehicle mark indicating the present position and the heading direction such that the heading direction is shown upwardly in the display screen. Herein, the display managing means includes: (i) an angle calculating means for calculating, relative to a travel-estimated road, which is estimated for the vehicle to travel, an intersecting angle of an extending direction of a cross road intersecting with the travel-estimated road at an intersection; (ii) a search area designating means for designating a search area shaped of a sector centering on the intersection to include the extending direction of the cross road; (iii) an intersecting point retrieving means for retrieving an arc intersecting point between the cross road and an outer circumference arc of the designated search area; and (iv) a display position determining means for determining a display position of a road name of the cross road based on a line segment between the intersection and the retrieved arc intersecting point.

As another example of the present invention, a navigation system for a vehicle is provided as follows. A displaying means is configured to have a display screen. A detecting means is configured to detect a present position and a heading direction of the vehicle. A storing means is configured to store road map data for displaying a road map including a road name of a road. A display managing means is configured to read road map data from the storing means based on the detected present position, and display a peripheral road map and a vehicle mark indicating the present position and the heading direction such that the heading direction is shown upwardly in the display screen. Herein, the display managing means displays a road name of a cross road, which intersects at an intersection with a travel-estimated road defined as a road the vehicle is estimated to travel, at a position in proximity to the cross road to have no overlap with the travel-estimated road; and the display managing means includes a display position determining means for determining a display position of the road name of the cross road at either an upper or a lower side of the cross road based on an intersecting angle between the cross road and a road portion of the travel-estimated road closer to the vehicle than the intersection.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Hereafter, a navigation system according to an embodiment of the present invention is explained with reference to drawing.

Figure 1:
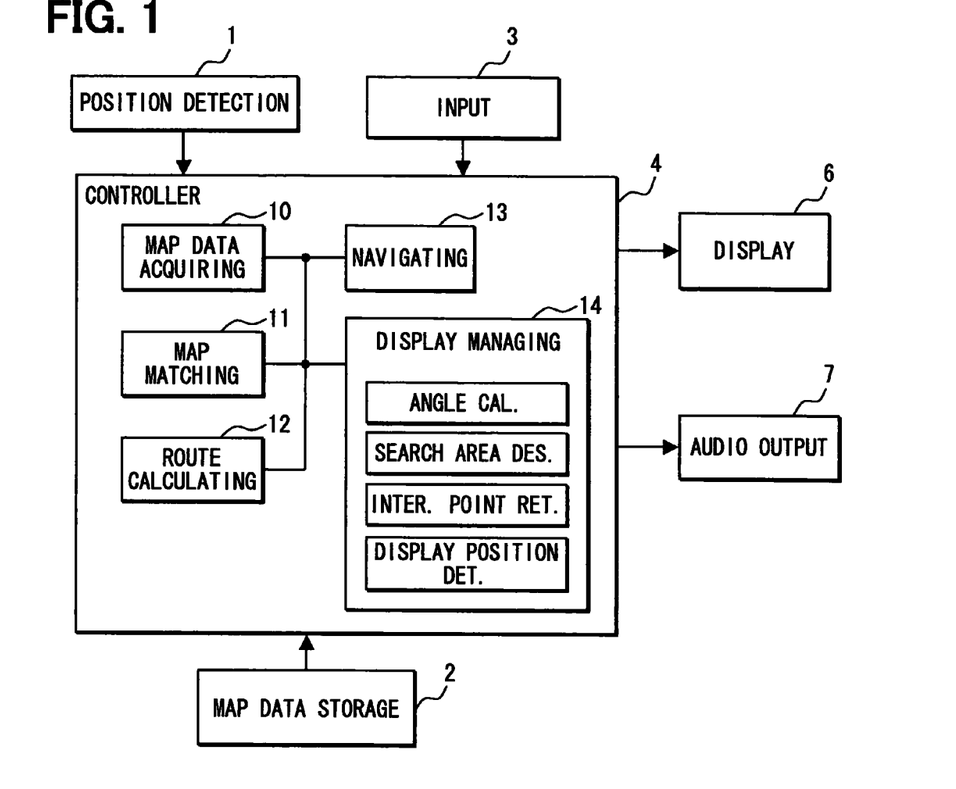
FIG. 1 is a block diagram illustrating an overall configuration of a navigation system according to an embodiment of the present invention.

FIG. 1 is a block diagram illustrating an overall configuration of the navigation system for a subject vehicle. The navigation system mounted in the subject vehicle includes the following: a position detection device 1, a map data storage device 2, an input device 3, and a controller 4 as a control apparatus connected to the foregoing. The system further includes a display device 6 and an audio output device 7, both of which are connected to the controller 4.

The position detection device 1 functions as a detecting means to include known sensors such as a geomagnetic sensor, a gyro sensor, a speed sensor, and a GPS sensor to detect a present position of the vehicle based on radio waves from satellites. The individual sensors have different types of detection errors from each other; therefore, they are used to complement each other. In addition, the position detection device 1 may be constructed of a part of the above sensors depending on the accuracy of each sensor.

The map data storage device 2 is used to input to the controller 4 road map data such as road data and background data for drawing road maps. The map data storage device 2 is provided with a storage medium storing the road map data such as a DVD-ROM, a hard disk drive (HDD) which are used from a required data volume. Thus, the map data storage device 2 functions as a map data storing means. Another storage medium may be used alternatively. Furthermore, the map data storage device 2 may be constructed of a communication device to acquire the map data from an external server etc.

The input device 3 (referred to as a switch information input device) is used for various inputs and includes a mechanical switch arranged, for example in a periphery of the display device 6 or a touch switch integrated into a display screen in the display device 6. For example, the navigation system according to the present embodiment has a known navigation function or a route guidance function. When a destination is inputted via the input device 3, an optimal route to the destination from the present position is automatically selected as a guide route. A route guidance or navigation along the guide route is performed using the audio output device 7 and the display device 6.

The display device 6 functions as a displaying means to include a liquid crystal display, for example, and have a display screen. The display device 6 displays, on the display screen, a peripheral road map around a present position of the vehicle along with a vehicle mark indicating the present position and heading direction of the vehicle based on the present position detected by the position detection device 1 and the road map data inputted from the map data storage device 2. The display device 6 further displays a selection display window for selecting a destination and a setting display window for setting ON/OFF of various kinds of functions of the navigation system.

The audio output device 7 includes a speaker to output sounds for route guidance and explanation to operate the navigation system. Thus, the display device 6 and the audio output device 7 can function as a notification means for notifying a user of various information.

The controller 4 is a usual computer to contain a CPU, a ROM, a RAM, an I/O circuit, and a bus line connected with the foregoing. A program for the controller 4 is written in the ROM. Based on the program, the CPU or the like executes predetermined data processing. In addition, in FIG. 1, main functions executed by the controller 4 are illustrated as a functional block diagram. That is, the controller 4 includes a map data acquiring portion 10, a map matching portion 11, a route calculating portion 12, a navigating portion (or a route guiding portion) 13, and a display managing portion (or display controlling portion) 14. Herein, "portion" can be referred to as a device, a control device, or control unit.

The map data acquiring portion 10 acquires from the map data storage device 2 peripheral road map data of a periphery including the present position detected by the position detection device 1, and gives it to the display managing portion 14. The display managing portion 14 draws a road map to a VRAM (Video Random Access Memory) based on the road map data provided from the map data storage device 2, and provides to the display device 6 a display signal for displaying the peripheral road map around the present position and the vehicle mark.

A swept path of the vehicle is accumulated in the map matching portion 11 as the vehicle travels. The map matching portion 11 collates the swept path of the vehicle with configurations (such as straight, curved) of roads. When determining that the presently displayed position of the subject vehicle is shifted or deviated from the actual position of the vehicle based on the collation, the map matching portion 11 gives a correct position of the subject vehicle to the display managing portion 14. The display managing portion 14 thus corrects the position of the subject vehicle on the road map displayed in the display device 6.

In addition, when a destination is inputted via the input device 3, the route calculating portion 12 generates an optimal guide route from the present position to the destination. In such a case, the road map data from the present position to the destination is acquired from the map data storage device 2; and the route calculating portion 12 applies the technique such as the well-known Dijkstra method to the acquired road map data and generates an optimal guide route. The generated guide route is given to the navigating portion (or route guiding portion) 13. The navigating portion 13 instructs the display managing portion 14 to discernibly display a road corresponding to the generated guide route using a specific color in the road map displayed in the display device 6. Furthermore, the navigating portion 13 calculates guidance points such as an intersection which the vehicle should turn right/left, and outputs to the audio output device 7 an audio signal to notify by sounds the direction of the right/left turn in the guidance point. In addition, the navigating portion 13 gives the information about the guidance point to the display managing portion 14. The display managing portion 14 generates a display signal for displaying an enlarged view near the intersection and a sketch of the highway in the display device 6.

The following explains a display process of a road map and a display managing or controlling process of a road name displayed on the road map.

Figure 2A:
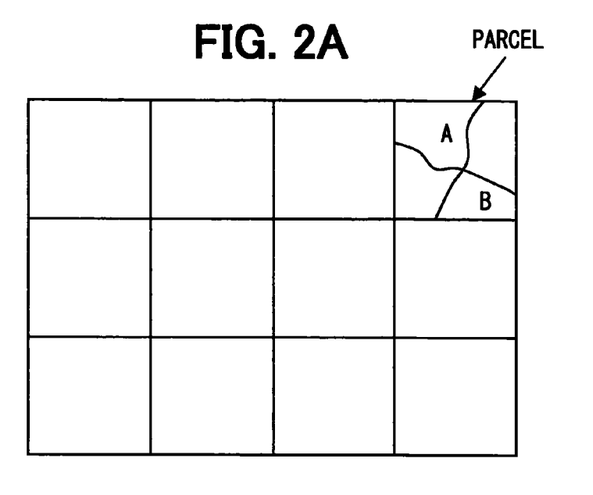
FIGS. 2A to 2C are diagrams illustrating a structure of road map data.

First, the data configuration of the road map data is explained based on FIGS. 2A to 2C. As illustrated in FIG. 2A, all display range of road map data are divided in mesh into rectangular map segments called parcels, which are individually stored in the map data storage device 2. The parcel or each map segment of the road map data includes background data and road data. The background data are data on background of displayed road maps, such as a natural feature and a railway line. The road data are data for display roads based on actual roads.

The road data has link string data indicating the configuration, the width, the number of lanes, and the like of each road included in one parcel. Here, a road is represented by links; a link connects nodes therebetween; a node includes an intersecting point, a branching point, a linking point, or the like. Further, a configuration interpolation point is designated between nodes to simulate an actual road having the configuration not straight. Here, a line segment is defined or drawn between a node and a configuration interpolation point or between configuration interpolation points. Thus, a link includes multiple line segments.

The link string data have data about multiple links which are included in a single parcel and which indicate road portions with an identical name or an identical travel condition. For example, as illustrated in FIG. 2A, a single parcel includes a road A and a road B. Thus, the road data of the parcel has link string data A corresponding to the road A and link string data B corresponding to the road B.

Figure 2B:
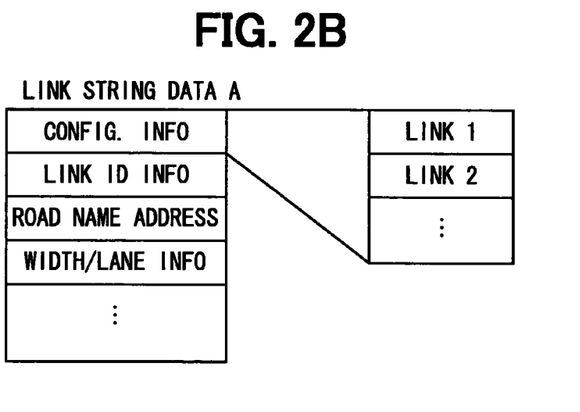

An example of the link string data A is illustrated in FIG. 2B. The link string data A includes configuration information to indicate a configuration of each link, link ID information to indicate a link ID uniquely assigned to each link for identification, a road name address to indicate a storage area storing the road name of the road A corresponding to link string data A, width/lane information to indicate a width and the number of lanes of the road A, and the like. In addition, the configuration information of each link includes coordinate string of the coordinates of the both ends and the configuration interpolation point(s).

Figure 2C:
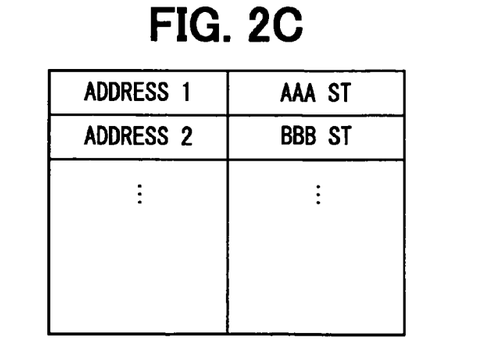

As mentioned above, the road name address to indicate the storage area storing the corresponding road name is included in the link string data; thus, the road name can be read out using the road name address. The road names are stored in order in the storage areas corresponding to the road name addresses of each link string data, as illustrated in FIG. 2C.

Figure 3:
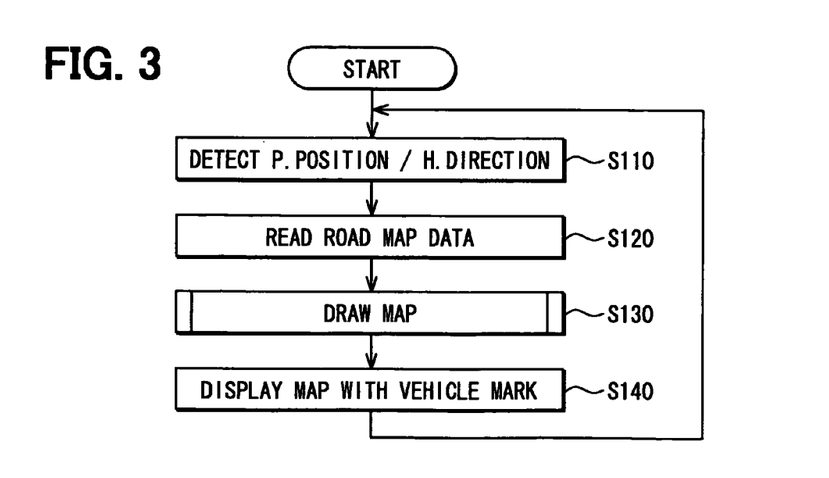
FIG. 3 is a flowchart illustrating a process for displaying a road map along with a present position and heading direction of a subject vehicle.

The following explains a display process using the road map data mentioned above for displaying a road map along with a subject vehicle mark to illustrate a present position and heading direction of the subject vehicle with reference to a flowchart in FIG. 3.

First, at S110, a present position and heading direction of the vehicle are detected based on a detecting result by the position detection device 1. At S120, the road map data for drawing a peripheral road map of a periphery of the present position of the vehicle detected at S110 is read from the map data storage device 2 with respect to each parcel based on the present position. At S130, the road map is drawn to the VRAM in the display managing portion 14 based on the read road map data. The drawing process of the road map is explained in detail later.

In addition, the VRAM in the display managing portion 14 is capable of drawing the road map larger than the range of the display screen in the display device 6 in order to perform a scroll display of the road map with the travel of the vehicle. At S140, the display managing portion 14 designates a display range such that a subject vehicle mark is displayed in a constant point and the heading direction is upward, and generates a display signal to display the road map having the designated display range in the display device 6. The display managing portion 14 may display the road map such that a predetermined orientation (for example, north) is upward in the display screen.

Figure 4:
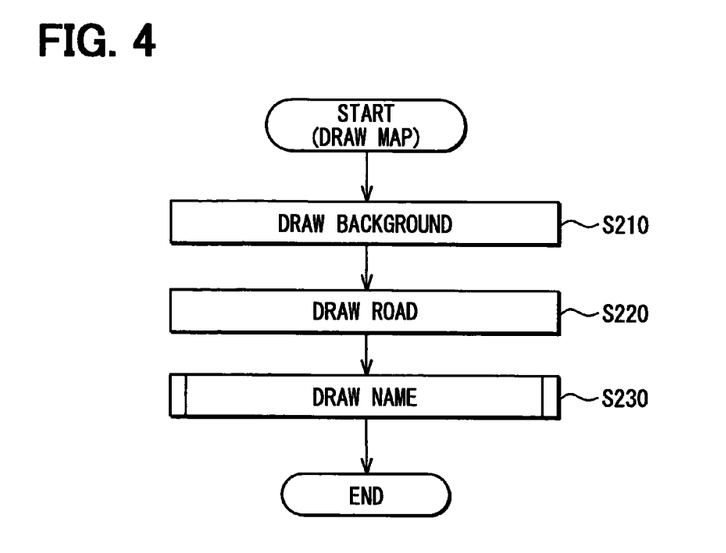
FIG. 4 is a flowchart illustrating a process for drawing a road map.

The following explains the drawing process at S130 with reference to a flowchart in of FIG. 4. As explained above, the VRAM of the display managing portion 14 includes drawing areas for individually drawing the background, the road, and the name. The display managing portion 14 generates a display signal, which piles up or overlaps the data drawn individually in the drawing areas, and gives it to the display device 6.

At S210, the background of the road map is drawn to the drawing area for drawing the background based on the background data of the read road map data. At S220, each road is drawn to the drawing area for drawing the road based on the configuration information of the read road map data. Furthermore, at S230, the display managing portion 14 reads out the road name which should be displayed based on the road name address in the link string data of the road data and determines a display position of each road name based on a process to be mentioned later. Each name is drawn in the determined display position.

In addition, when the road map is once drawn in the VRAM, the drawn road map is maintained until the vehicle moves to approach the end of the drawing area. When the vehicle approaches the end of the drawing area, a road map is newly drawn in the VRAM to follow the end of the drawing area while removing the unnecessary road map from the VRAM.

Figure 5:
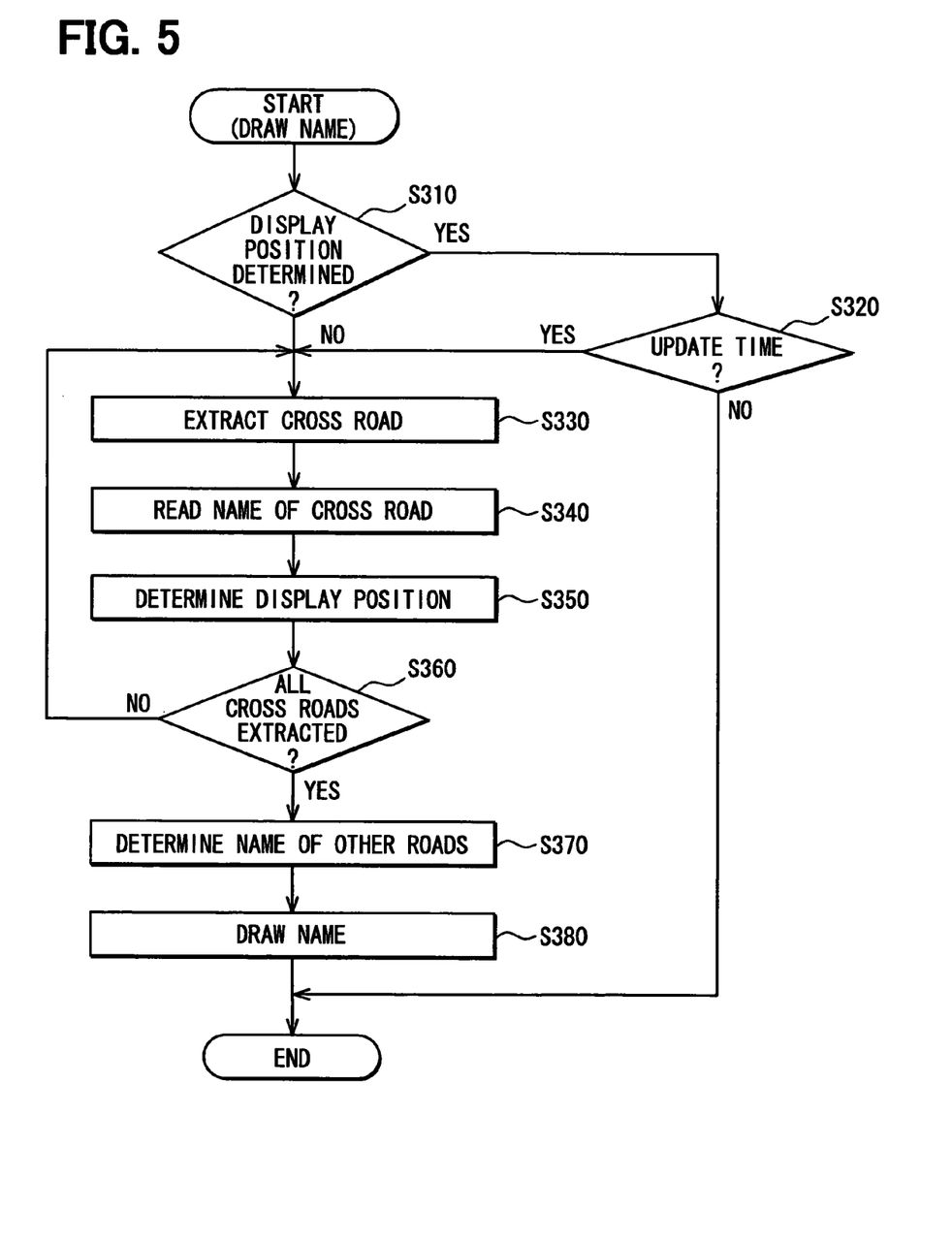
FIG. 5 is a flowchart illustrating a process for drawing a road name after determining a display position.

The following explains the road name drawing process at S230 with reference to a flowchart in of FIG. 5. At S310, it is determined whether the display position of each road name is fixed and has been already drawn in the drawing area for drawing road names. When the determination is affirmed, the processing proceeds to S320.

At S320, it is determined whether it is the update time to update a name display based on several conditions as follows. For example, a condition is fulfilled when the heading direction of the vehicle changes with the travel and the angle of the road map displayed changes a predetermined degree or more (for example, 45 degrees or more). In addition, another condition is fulfilled when the road the vehicle runs is changed, when the guide route changes, or when the node of an intersection is passed through. When the determination at S320 is negated, the process directly ends. When the determination at S320 is affirmed or the determination at S310 is negated, the processing proceeds to S330.

Here, a road estimated to travel or referred to as a travel-estimated road is defined as a road which the subject vehicle is estimated to travel or run from now on. Further, if the route guidance or navigating is presently being performed, the road along which the navigating is performed is regarded as the travel-estimated road; if the route guidance is not being performed, the road the subject vehicle presently travels is regarded as the travel-estimated road. At S330, a cross road is extracted which intersects with the travel-estimated road. For instance, link string data are extracted which include the link having the node of the same coordinates included in the links constituting the travel-estimated road. Here, a road, which intersects with the travel-estimated road with an overpass or underpass, is excluded from candidates for the above extraction.

At S340, the road name of the cross road is read based on the road name address of the link string data of the extracted cross road. At S350, a display position of the cross road is determined such that the road name is displayed in proximity to the cross road and the travel-estimated road without overlapping with the travel-estimated road.

Figure 6A:
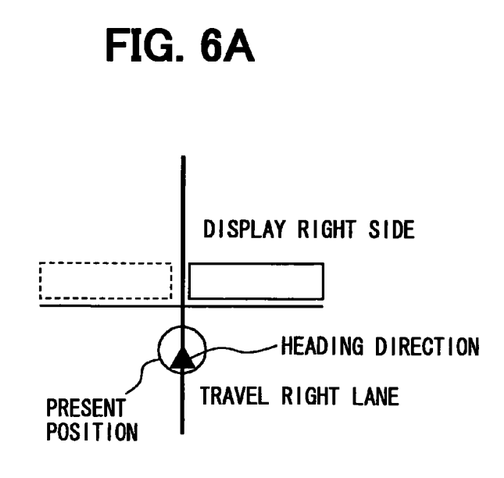
FIGS. 6A, 6B are diagrams for explaining examples of rules to select either right or left cross road as a road name display target.

The following explains the procedure of the determination processing for the display position of the road name with reference to FIGS. 6A, 6B, 7A to 7D, 8, 9A to 9E, and 10A to 10C. First, as illustrated in FIG. 6A, a road extends in both left and right sides relative to the travel-estimated road while the both sides have the same road name. When the subject vehicle travels the right lane of the road, the display position is defined such that the priority for displaying is given to the right side of the cross road. In contrast, when the subject vehicle travels the left lane of the road, the display position is defined such that the priority for displaying is given to the left side of the cross road.

Figure 6B:
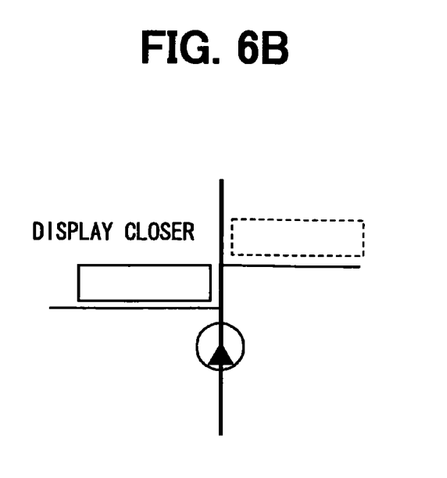

In addition, as illustrated in FIG. 6B, a road extends in both left and right sides relative to the travel-estimated road while each intersecting point is deviated from each other. In such a case, the display position is determined such that the road side corresponding to the intersecting point closer to the subject vehicle is prioritized in displaying.

Figure 7A:
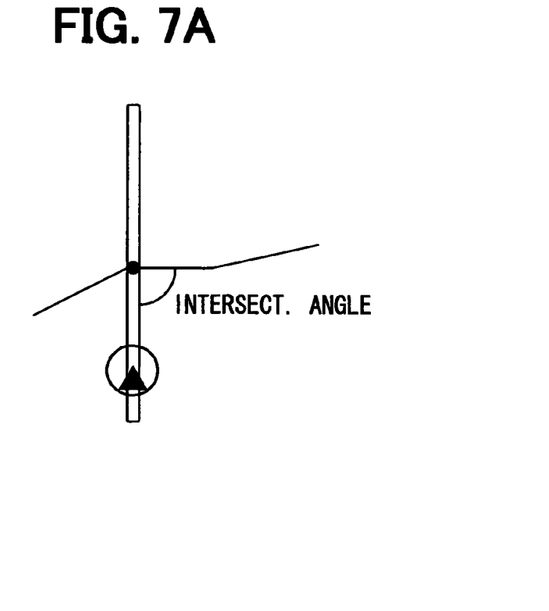
FIGS. 7A to 7D are diagrams explaining a procedure of determining a display position of a road name of a cross road.

After determining either left or right side of the cross road as the road name display target, the display position is further determined in a specific condition with the following procedure. First, as illustrated in FIG. 7A, an intersecting angle centering on an intersection between a cross road and a travel-estimated road is obtained between (i) an initial link exiting directly from the intersection of the left or right side selected as the display target of the cross road and (ii) a link directly entering the intersection and closer to the subject vehicle than the intersection. The intersecting angle can be obtained with calculation based on the coordinate information of each link.

In addition, when the above initial link of the cross road is assigned with a configuration interpolation point, the line segment up to the configuration interpolation point is used for obtaining the intersecting angle. Similarly, when the above entering link of the travel-estimated road is assigned with a configuration interpolation point, the line segment from the intersection up to the configuration interpolation point is used for obtaining the intersecting angle. In short, the intersecting angle is obtained from, of both the cross road and travel-estimated road, straight portions directly connected with the intersection therebetween.

An intersecting angle can be differently obtained or defined. For example, an intersecting angle may be obtained between (i) the cross road and (ii) an initial link of the travel-estimated road directly exiting from the intersection and farther to the subject vehicle than the intersection. In addition, an intersecting angle can be obtained between (i) the cross road and (ii) a reference line orthogonal to the travel-estimated road at the intersection.

Figure 8:
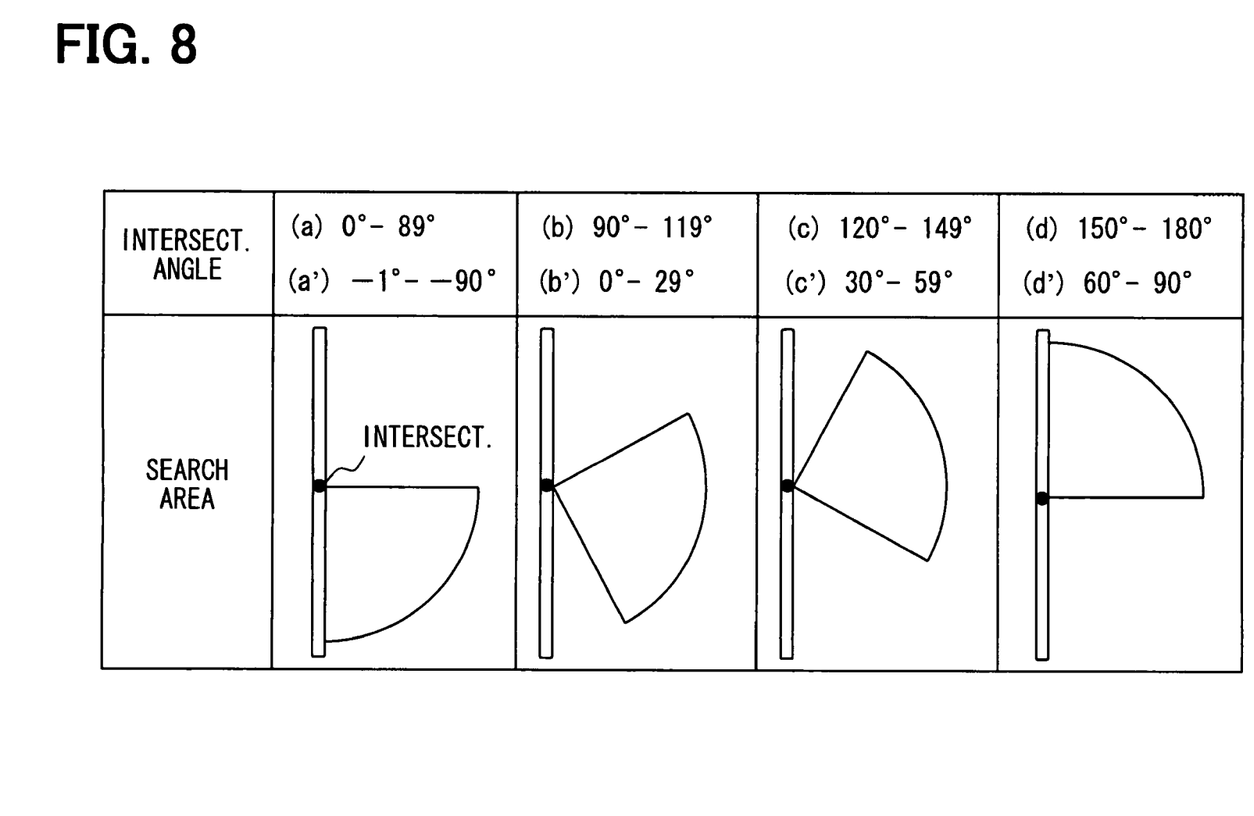
FIG. 8 is a diagram explaining designation of a sector search area.

Next, a search area is designated based on the obtained intersecting angle on the road map data. As illustrated in FIG. 8, a search area is used or defined as being shaped of a sector having a sector central angle of 45 degrees with a predetermined constant radius. A range of the search area is determined based on the obtained intersecting angle. For example, as shown in (a) in FIG. 8, when an intersecting angle is 0 to 89 degrees, the sector centering on the intersecting point (i.e., intersection) between the cross road and the travel-estimated road is arranged such that a side of the sector contacts a road portion of the travel-estimated road entering the intersection and closer to the subject vehicle than the intersection. As the intersecting angle increases, the sector search area pivots counter clockwise stepwise, every 30 degrees, for example. When the intersecting angle reaches 150 degrees and more, the sector search area is designated such that another side of the sector contacts a road portion of the travel-estimated road exiting from the intersection and farther to the subject vehicle than the intersection.

In addition, the central angle of the sector search area may be an angle other than 45 degrees. In addition, the angle pivoted stepwise of the sector search area may be other than every 30 degrees. In short, the sector search area should just be designated to include the direction in which the cross road is expected to extend from the travel-estimated road. In addition, in FIG. 8, intersecting angles (a') to (d') are defined as being between the cross road and a reference line orthogonal to the travel-estimated road at the intersection.

Figure 7B:
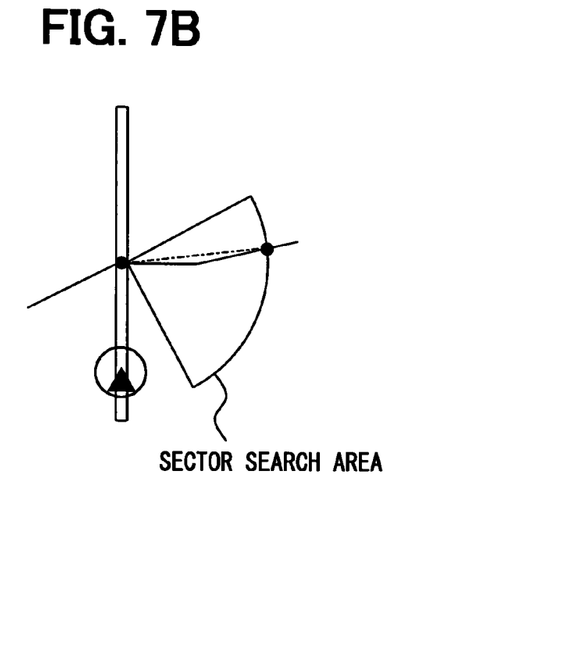
Figure 7C:
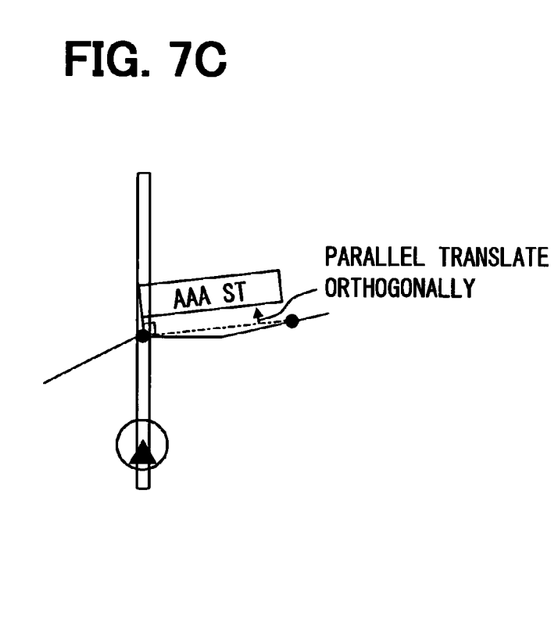
Figure 7D:
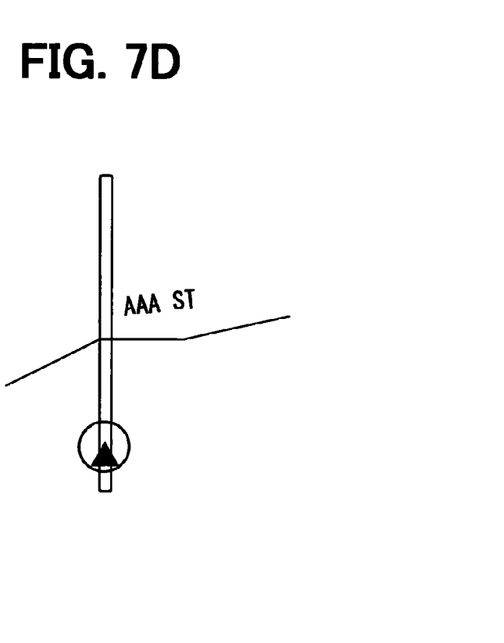

The sector search area is thus designated. Then, as illustrated in FIG. 7B, an arc intersecting point is obtained between the cross road and an outer circumference line (arc) of the sector search area. When the arc intersecting point of the sector search area is obtained, as illustrated in FIG. 7B, a line segment is drawn to connect between (i) the intersection of the travel-estimated road and (ii) the arc intersecting point of the sector search area. Furthermore, the line segment is moved or parallel translated orthogonally to the line segment itself by a predetermined number of dots in the display screen of the display device 6, thus obtaining a parallel line segment. The display position of the road name of the cross road is determined such that the lower end of the road name accords with the moved line segment or the parallel line segment obtained by the parallel translation, as illustrated in FIG. 7C. Then, as illustrated in FIG. 7D, the road name is displayed on the determined position. As a result, the display of the road name of the cross road is in proximity to the travel-estimated road while having the same inclination as the line segment.

Therefore, when the cross road extends straight, the line segment and the cross road accord with each other. The display of the road name can be on the basis of the line segment (namely, cross road). Therefore, the display of the road name in proximity to the travel-estimated road is located such that a user can clearly recognize that such a road name indicates the cross road. As a result, the user can determine which road the subject vehicle should proceed to, easily and correctly by using the displayed road name as a signpost.

In addition, when the cross road bends on the way or is a dead end, a sector search area with the above predetermined radius may not find an arc intersecting point with the cross road. In such a case, a sector search area is re-designated with a radius shorter than the previous predetermined radius so as to find an arc intersecting point with the cross road. When an arc intersection point is not yet obtained, the sector search area is re-designated with a much shorter radius. By repeating designation of the search area with the radius shorten, an arc intersecting point is eventually obtained.

In addition, in the example illustrated in FIGS. 7A to 7D, since the cross road extends almost orthogonally to the travel-estimated road, the road name is displayed in the upper side of the cross road in the display screen. Such a display position or arrangement of a road name relative to the cross road is adopted to generally enable a user to recognize easier.

However, simply parallel translating of the line segment upward of the cross road may overlap the road name and travel-estimated road with each other, causing the display of the travel-estimated road or the like to be difficult to see. In addition, visibility of the road name may be improved or enhanced when the road name is displayed in the lower side of the cross road depending on the intersecting angle. Then, various kinds of display examples of road names are explained below.

Figure 9A:
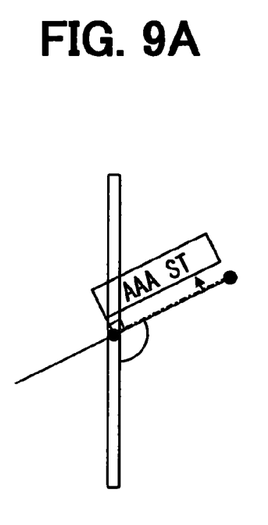
FIGS. 9A to 9E are diagrams for explaining examples of displaying road names.

First, FIG. 9A illustrates an example where an intersecting angle is so large as to overlap the road name and the travel-estimated road therebetween if the road name is displayed in the upper side of the cross road. That is, the line segment obtained using the above-mentioned procedure is parallel translated in a direction orthogonal to the extending direction of the line segment itself; the display position of the road name is determined that the lower end of the road name is located on the line segment parallel translated. In such a case, the display of the road name of the cross road and travel-estimated road partially overlap with each other. If such a display is practically performed, it is difficult to view the travel-estimated road.

Figure 9B:
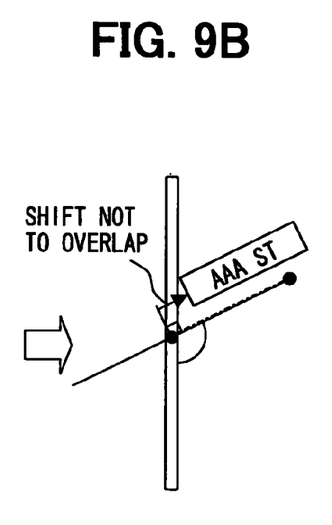

Therefore, when the road name of the cross road and the travel-estimated road thus overlap, the display position of the road name is shifted along the inclination of the line segment to the position where the road name does not overlap with the travel-estimated road to find the renewed display position of the road name of the cross road, as illustrated in FIG. 9B.

The above overlap between the travel-estimated road and the road name of the cross road may occur when the intersecting angle is equal to or greater than 90 degrees. Therefore, when an intersecting angle is equal to or greater than 90 degrees, a temporary display position is determined based on the position resulting from the parallel translation of the line segment upward in the display screen. With respect to the temporary display position, it is determined whether the overlap between the road name of the cross road and the travel-estimated road arises. If the overlap does not arise, the temporary display position is determined as a proper display position. In contrast, when the overlap arises, as mentioned above, the temporary display position is shifted parallel along the inclination of the line segment to a certain position where the above overlap disappears. The certain position is determined as a proper display position.

Figure 9C:
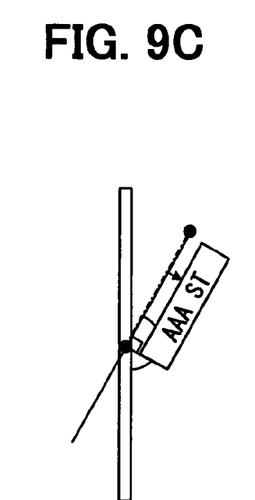

FIG. 9C illustrates an example where the intersecting angle of the travel-estimated road and the cross road is larger than that in FIG. 9A, so that a display position of the road name of the cross road cannot be substantially secured. For example, when an intersecting angle exceeds 150 degrees, the area between the travel-estimated road and the upper side of the cross road is narrow, it is difficult to display the road name in the upper side of the cross road.

Thus, when an intersecting angle exceeds a predetermined maximum angle (for example, 150 degrees), the road name is displayed in the lower side of the cross road as illustrated in FIG. 9C. For example, a line segment is obtained between (i) the travel-estimated road and the intersecting angle and (ii) an arc intersecting point between the outer circumference arc of the sector search area and the cross road; then, the line segment is parallel translated in the direction orthogonal to the line segment itself and shifted downward in the display screen by a predetermined display dots. The display position of the road name of the cross road is determined such that the upper end of the road name accords with the line segment parallel translated. Thus, the road name of the cross road can be displayed with a high possibility in proximity to the travel-estimated road so as not to overlap the cross road or travel-estimated road. The display of the road name can be thus performed for the user to view easily.

Figure 9D:
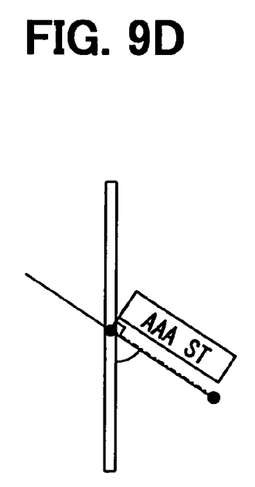

FIG. 9D illustrates an example where an intersecting angle between the travel-estimated road and the cross road is smaller than 90 degrees, thereby securing a display area for the road name of the cross road in the upper side of the cross road. In such a case, even if the road name is displayed in the upper side of the cross road, it does not overlap with the travel-estimated road. Thus, defining a temporary display position explained in FIGS. 9A, 9B is not necessary. That is, the line segment obtained using the above-mentioned procedure is parallel translated in a direction orthogonal to the extending direction of the line segment itself; a proper display position of the road name is directly determined such that the lower end of the road name is located on the line segment parallel translated in the display screen.

Figure 9E:
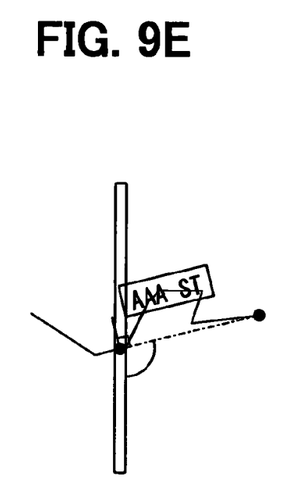

FIG. 9E illustrates an example where the cross road bents in multiple points.

Here, a line segment is obtained between (i) the travel-estimated road and the intersecting angle and (ii) an arc intersecting point between the outer circumference arc of the sector search area and the cross road; then, the display position is determined based on the obtained line segment. In such a case, the cross road and its road name may partially overlap with each other as illustrated in FIG. 9E.

Here, the line segment is drawn to represent the whole of the cross road bending at the multiple points. Therefore, the road name can be displayed on the position based on the line segment such that the user can recognize that the road name represents the cross road. In other words, in the present embodiment, the cross road is not always a road the user should travel. Priority is thus given to the user's readability of the road name of the cross road while accepting some difficulty in viewing.

In addition, at S330 of the flowchart of FIG. 5, it may be desirable to extract a cross road in order from a side closer to the vehicle toward the traveling direction of the vehicle. It is because the display position of the road name of the cross road closer to the vehicle is preferentially determined than other cross roads. That is, in the present embodiment, the priority of the display is given to the road name having the display position which is previously determined; another name is prevented from appearing in the position which overlaps with the road name previously displayed. Therefore, the name having a display position determined earlier than other names is given the higher priority.

Figure 10A:
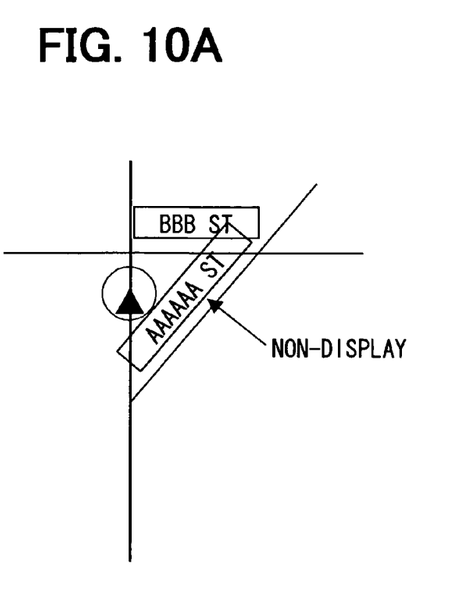
FIGS. 10A to 10C are diagrams explaining priority in displaying road names.

For example, as illustrated in FIG. 10A, the road name display of a cross road extended from an intersection the vehicle has already passed through has a lower priority than that of a cross road extended from an intersection the vehicle is going to pass through from now on. Accordingly, when the road names of both the cross roads overlap, the road name of the cross road extended from the intersection the vehicle has already passed through is not displayed.

Figure 10B:
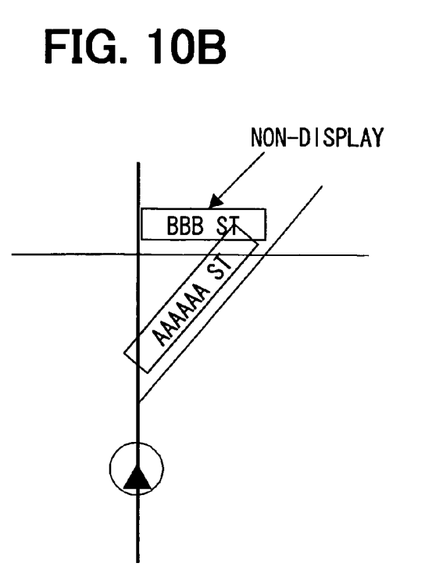

Further, as illustrated in FIG. 10B, a cross road extended from an intersection closest to the vehicle has a higher priority in displaying a road name among intersections the vehicle is going to pass through. Accordingly, when the road names of the cross roads overlap, the road name of the cross road extended from the intersection farther than the closest intersection is not displayed.

Figure 10C:
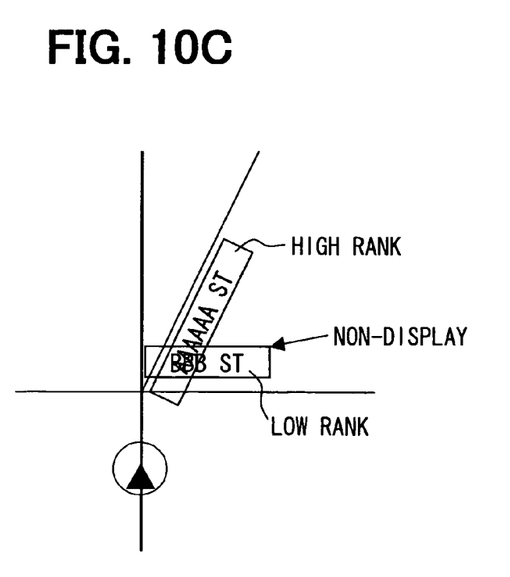

Furthermore, as illustrated in FIG. 10C, when multiple cross roads are extended from the same point of the travel-estimated road, the priority in displaying road names is given based on the rank of roads such as national road>prefectural road>municipal road, the number of lanes, or width of road. In FIG. 10C, the cross road extended diagonally forward is higher in the road rank than the cross road extended orthogonal to the travel-estimated road. Therefore, the road name of the cross road extended orthogonally to the travel-estimated road is not displayed.

Returning to the flowchart in FIG. 5, at S360, it is determined whether all the cross roads which intersect with the travel-estimated road are extracted and the display positions of their road names are determined. When it is determined that another cross road not extracted is present, the processing returns to S330, where the above-mentioned process are repeated to determine the display position of the corresponding road name.

At S370, in the read road data, roads other than the cross road intersecting with the travel-estimated road are extracted; then, the display positions are determined. Herein, the display of the road names of roads other than the cross road can be omitted. At S380, each road name is drawn in the corresponding determined display position.

As explained above, the display position of each road name is determined so as to draw the road name in the drawing area for drawing names. The name of the cross road which intersects with a present-travel road, which is a road the vehicle is presently traveling or running, is displayed at a position in proximity to the the present-travel road and allowing the user to clearly recognize that the displayed road name corresponds to the cross road. Accordingly, the user can see easily the road name of the road the vehicle may run next. As a result, the user can determine which road the subject vehicle should proceed to, easily and correctly by using the displayed road name as a signpost.

In addition, the road name of the present-travel road may be displayed on the road map along the present-travel road or on the top right of the display screen.

The preferred embodiment of the present invention is thus described; however, without being restricted to the embodiment mentioned above, the present invention can be variously modified as long as not deviating from the scope thereof.

For example, although the embodiment mentioned above explains displaying of the road name of the cross road to intersect with the travel-estimated road, other names such as address names or facility names can be also displayed.

Herein, in displaying the address name and the facility name, the display priority of the road name of a cross road may be maintained as the higher than those of the address name or the facility name.

Thereby, the display position of the road name of the cross road is first determined preferentially with the procedure and the rule which are mentioned above. The display positions of the address name and the facility name are determined subsequently not to overlap with the road name of the cross road. The display positions of the address name and the facility name are determined under comparatively loose restriction, they can be displayed on the suitable positions in general.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the disclosure described herein are set out in the following clauses.

As an aspect of the disclosure, a navigation system for a vehicle is provided as follows. A displaying means is configured to have a display screen. A detecting means is configured to detect a present position and a heading direction of the vehicle. A storing means is configured to store road map data for displaying a road map including a road name of a road. A display managing means is configured to read road map data from the storing means based on the detected present position, and display a peripheral road map and a vehicle mark indicating the present position and the heading direction such that the heading direction is shown upwardly in the display screen. Herein, the display managing means includes: (i) an angle calculating means for calculating, relative to a travel-estimated road, which is estimated for the vehicle to travel, an intersecting angle of an extending direction of a cross road intersecting with the travel-estimated road at an intersection; (ii) a search area designating means for designating a search area shaped of a sector centering on the intersection to include the extending direction of the cross road; (iii) an intersecting point retrieving means for retrieving an arc intersecting point between the cross road and an outer circumference arc of the designated search area; and (iv) a display position determining means for determining a display position of a road name of the cross road based on a line segment between the intersection and the retrieved arc intersecting point.

When determining the road which the user should proceed to, one road may be chosen from the roads connected to the road which the vehicle runs now or the vehicle is estimated to run from now on.

Accordingly, the above mentioned navigation system determines the display position of the road name of the cross road intersecting with the travel-estimated road of the vehicle as being displayed intelligibly for the user. Under the configuration of the above navigation system, when the cross road extends straight, the line segment and the cross road accord with each other. The road name can be displayed on the basis of the line segment (namely, cross road). If a cross road bends at multiple points, the line segment can be drawn to represent the whole of the cross road bending at multiple points. Therefore, the road name can be displayed on the position based on the line segment such that the user can recognize that the road name represents the cross road. As a result, the user can determine which road the subject vehicle should proceed to, easily and correctly by using the displayed road name as a signpost.

As an optional aspect of the above navigation system, the search area designating means may designate the search area with a first predetermined radius; and when no arc intersecting point is retrieved with the first predetermined radius, the search area designating means may re-designate a search area with a radius shorter than the first predetermined radius. Further, the search area designating means may repeatedly designate a search area while gradually shortening a radius from the first predetermined radius until an arc intersecting point is successfully retrieved.

Thus, even if the cross road bends before reaching the outer circumference arc of the tentatively drawn sector search area, an arc intersecting point between the outer circumference arc and the cross road can be obtained by shortening a radius of the sector.

As an optional aspect of the above navigation system, the display position determining means may define the line segment between the intersection and the arc intersecting point and then define an additional line segment by parallel translating the line segment orthogonally to an extending direction of the line segment by a predetermined distance; and the display position determining means may determine, as the display position of the road name of the cross road, a position based on the additional line segment to have no overlap with the travel-estimated road.

Further, the display position determining means may find an intersecting angle between the line segment and a road portion of the travel-estimated road closer to the vehicle than the intersection; and when the intersecting angle is less than 90 degrees, the display position determining means may determine, as the display position of the road name of the cross road, a position defined by parallel translating the line segment upward in the display screen.

Further, the display position determining means may find an intersecting angle between the line segment and a road portion of the travel-estimated road closer to the vehicle than the intersection; when the intersecting angle is in a range from 90 degrees to a predetermined angle greater than 90 degrees, the display position determining means may determine, as a temporary display position of the road name of the cross road, a position defined by parallel translating the line segment upward in the display screen; and when the travel-estimated road overlaps with the road name in the temporary display position, the display position determining means may determine the display position of the road name of the cross road by shifting the temporary display position along an inclination of the line segment to a position to have no overlap with the travel-estimated road.

Further, the display position determining means may find an intersecting angle between the line segment and a road portion of the travel-estimated road closer to the vehicle than the intersection; and when the intersecting angle is greater than a predetermined angle exceeding 90 degrees, the display position determining means may determine, as the display position of the road name of the cross road, a position defined by parallel translating the line segment downward in the display screen.

As another aspect of the disclosure, a navigation system for a vehicle is provided as follows. A displaying means is configured to have a display screen. A detecting means is configured to detect a present position and a heading direction of the vehicle. A storing means is configured to store road map data for displaying a road map including a road name of a road. A display managing means is configured to read road map data from the storing means based on the detected present position, and display a peripheral road map and a vehicle mark indicating the present position and the heading direction such that the heading direction is shown upwardly in the display screen. Herein, the display managing means displays a road name of a cross road, which intersects at an intersection with a travel-estimated road defined as a road the vehicle is estimated to travel, at a position in proximity to the cross road to have no overlap with the travel-estimated road; and the display managing means includes a display position determining means for determining a display position of the road name of the cross road at either an upper or a lower side of the cross road based on an intersecting angle between the cross road and a road portion of the travel-estimated road closer to the vehicle than the intersection.

Thereby, the road name of the cross road intersecting the travel-estimated road can be displayed to allow a user to view it easily.

As an optional aspect of the above navigation system, a navigating means may be further configured to navigate the vehicle along a guide route which is designated when a destination is specified. Here, the display managing means may regard as the travel-estimated road the guide route along which the vehicle is being navigated.

This is because when the route guidance or navigating is executed, the vehicle is estimated to travel in accordance with the guide route.

Further, the display managing means may regard, as the travel-estimated road, a road following a road the vehicle runs when the vehicle is not navigated.

This is because when the vehicle is not navigated, the vehicle is estimated to travel a same road or a following road. Here, a road following a road the vehicle runs can be defined as a road connected in a direction of natural progress of the presently traveling road without changing or turning to a cross road even if the cross road is present ahead of the vehicle.

As an optional aspect of the above navigation system, the cross road may be extended from the intersection to a right side and left side relative to the travel-estimated road. When the vehicle runs a right side of the travel-estimated road, a road name may be displayed with respect to the right side of the cross road. When the vehicle runs a left side of the travel-estimated road, a road name may be displayed with respect to the left side of the cross road.

It will be obvious to those skilled in the art that various changes may be made in the above-described embodiments of the present invention. However, the scope of the present invention should be determined by the following claims.

What is claimed is:

1. A navigation system for a vehicle, the system comprising:
   a displaying means having a display screen;
   a detecting means for detecting a present position and a heading direction of the vehicle;
   a storing means for storing road map data for displaying a road map including a road, name of a road that is indicated by a plurality of line segments;
   a display managing means for reading road map data from the storing means based on the detected present position, and displaying a peripheral road map and a vehicle mark indicating the present position and the heading direction of the vehicle such that the heading direction is shown upwardly in the display screen, wherein
   the display managing means includes:
   an angle calculating means for calculating, relative to a traveling road that the vehicle presently travels on, an intersecting angle of an extending direction of a cross road intersecting with the traveling road at an intersection;
   a search area designating means for designating a search area shaped of a sector centering on the intersection to include the extending direction of the cross road;
   an intersecting point retrieving means for determining and retrieving an arc intersecting point of the cross road at an outer circumference arc of the designated search area; and
   a display position determining means for determining a display position of a road name of the cross road based on a line segment between the intersection and the retrieved arc intersecting point.

2. The navigation system according to claim 1, wherein:
   the search area designating means designates the search area with a first predetermined radius; and
   when no arc intersecting point is retrieved with the first predetermined radius, the search area designating means re-designates a search area with a radius shorter than the first predetermined radius.

3. The navigation system according to claim 2, wherein the search area designating means repeatedly designates a search area while gradually shortening a radius from the first predetermined radius until an arc intersecting point is successfully retrieved.

4. The navigation system according to claim 1, wherein:
   the display position determining means defines the line segment between the intersection and the arc intersecting point and then defines an additional line segment by parallel translating the line segment orthogonally to an extending direction of the line segment by a predetermined distance; and
   the display position determining means determines, as the display position of the road name of the cross road, a position based on the additional line segment to have no overlap with the traveling road.

5. The navigation system according to claim 4, wherein:
   the display position determining means finds an intersecting angle between (i) the line segment between the intersection and the arc intersecting point and (ii) a road portion of the traveling road between the present position of the vehicle and the intersection; and
   when the intersecting angle is less than 90 degrees, the display position determining means determines, as the display position of the road name of the cross road, a position defined by parallel translating the line segment upward in the display screen.

6. The navigation system according to claim 4, wherein:
   the display position determining means finds an intersecting angle between (i) the line segment between the intersection and the arc intersecting point and (ii) a road portion of the traveling road between, the present position of the vehicle and the intersection;

when the intersecting angle is in a range from 90 degrees to a predetermined angle greater than 90 degrees, the display position determining means determines, as a temporary display position of the road name of the cross road, a position defined by parallel translating the line segment upward in the display screen; and when the traveling road overlaps with the road name in the temporary display position, the display position determining means determines the display position of the road name of the cross road by shifting the temporary display position along an inclination of the line segment to a position to have no overlap with the traveling road.

7. The navigation system according to claim 4, wherein:
the display position determining means finds an intersecting angle between (i) the line segment between the intersection and the arc intersecting point and (ii) a road portion of the traveling road between the present position of the vehicle and the intersection; and when the intersecting angle is greater than a predetermined angle exceeding 90 degrees, the display position determining means determines, as the display position of the road name of the cross road, a position defined by parallel translating the line segment downward in the display screen.

8. The navigation system according to claim 1, wherein:
the cross road is extended from the intersection to a right side and a left side relative to the traveling road, the traveling road comprising a ride side and a left side;

when the vehicle runs the right side of the traveling road, the road name of the cross road is displayed with respect to the right side of the traveling road; and when the vehicle runs the left side of the traveling road, the road name of the cross road is displayed with respect to the left side of the traveling road.

9. A navigation system for a vehicle, the system comprising:
a displaying means having a display screen;
a detecting means for detecting a present position and a heading direction of the vehicle;
a storing means for storing road map data for displaying a road map including a road name of a road, the road being indicated by a plurality of line segments; and
a display managing means for
reading road map data from the storing means based on the detected present position,
displaying a peripheral road map and a vehicle mark indicating the present position and the heading direction such that the heading direction is shown upwardly in the display screen, and
displaying a road name of a cross road, which intersects at an intersection with a traveling road, at a position in proximity to the cross road such that the road name of the cross road, does not overlap with the traveling road,
the display managing means being further configured to include a display position determining means for determining a display position of the road name of the cross road only through an intersecting angle defined as an angle formed at the intersection between (i) the cross road and (ii) a road portion of the traveling road directly entering the intersection, the road portion being between the present position of the vehicle and the intersection, and
the display position determining means determining the display position of the road name of the cross road
(i) at a lower side of the cross road when the intersecting angle exceeds a predetermined maximum angle, and
(ii) at an upper side of the cross road when the intersecting angle does not exceed the predetermined maximum angle.

10. The navigation system according to claim 9, wherein:
the display managing means includes:
an angle calculating means for calculating an intersecting angle of an extending direction of the cross road at the intersection, relative to the traveling road;
a search area designating means for designating a search area shaped of a sector centering on the intersection to include the extending direction of the cross road; and
an intersecting point retrieving means for retrieving an arc intersecting point between the cross road and an outer circumference arc of the designated search area, wherein
the display position determining means defines a line segment between the intersection and the arc intersecting point and finds an intersecting angle between the traveling road and the cross road by regarding an extending direction of the line segment as the extending direction of the cross road.

11. The navigation system according to claim 10, wherein:
the search area designating means designates the search area with a first predetermined radius; and
when no arc intersecting point is retrieved with the first predetermined radius, the search area designating means re-designates a search area with a radius shorter than the first predetermined radius.

12. The navigation system according to claim 11, wherein the search area designating means repeatedly designates a search area while gradually shortening a radius from the first predetermined radius until an arc, intersecting point is successfully retrieved.

13. The navigation system according to claim 10, wherein:
the display position determining means defines the line segment between the intersection and the arc intersecting point and then defines an additional line segment by parallel translating the line segment orthogonally to an extending direction of the line segment by a predetermined distance; and
the display position determining means determines, as the display position of the road name of the cross road, a position based on the additional line segment to have no overlap with the traveling road.

14. The navigation system according to claim 13, wherein:
the display position determining means finds an intersecting angle between (i) the line segment between the intersection and the arc intersecting point and (ii) a road portion of the traveling road estimated to run before the intersection; and
when the intersecting angle is less than 90 degrees, the display position determining means determines, as the display position of the road name of the cross road, a position defined by moving the line segment parallel upward in the display screen.

15. The navigation system according to claim 13, wherein:
the display position determining means finds an intersecting angle between (i) the line segment between the intersection and the arc intersecting point and (ii) a road portion of the traveling road between the present position of the vehicle and the intersection;
when the intersecting angle is in a range from 90 degrees to a predetermined angle greater than 90 degrees, the display position determining means determines, as a temporary display position of the road name of the cross road, a position defined by parallel translating the line segment upward, in the display screen; and when the traveling road overlaps with the road name in the temporary display position, the display position determining means determines the display position of the road name of the cross road by shifting the temporary display position along an inclination of the line segment to a position to have no overlap with the traveling road.

16. The navigation system according to claim 13, wherein:
the display position determining means finds an intersecting angle between (i) the line segment between the present position of the vehicle and the intersection and (ii) a road portion of the traveling road between the present position of the vehicle and the intersection; and
when the intersecting angle is greater than a predetermined angle exceeding 90 degrees, the display position determining means determines, as the display position of the road name of the cross road, a position defined by parallel translating the line segment downward in the display screen.

17. The navigation system according to claim 9, wherein:
the cross road is extended from the intersection to a right side and a left side relative to the traveling road, the traveling road comprising a ride side and a left side;
when the vehicle runs the right side of the traveling road, the road name of the cross road is displayed with respect to the right side of the traveling road; and
when the vehicle runs the left side of the traveling road, the road name of the cross road is displayed with respect to the left side of the traveling road.

18. The navigation system according to claim 9, wherein:
the road name presented by a string of a plurality of characters; and
the string of the plurality of characters of the road name of the cross road is displayed by the display position determining means at the lower side of the cross road and in parallel with the cross road extending from the intersection when the intersecting angle exceeds the predetermined maximum angle, whereas
the string of the plurality of characters of the road name of the cross road is displayed by the display position determining means at the upper side of the cross road and in parallel with the cross road extending from the intersection when the intersecting angle does not exceed the predetermined maximum angle.

19. A navigation system for a vehicle, the system comprising:
a displaying device having a display screen;
a position detection device that detects a present position and a heading direction of the vehicle;
a storage device that stores road map data for displaying a road map including a road name of a road that is indicated by a plurality of line segments, the road name presented by a string of a plurality of characters;
a display managing portion that reads road map data from the storage device based on the detected present position, and displaying a peripheral road map and a vehicle mark indicating the present position and the heading direction of the vehicle such that the heading direction is shown upwardly in the display screen, wherein
the display managing portion includes:
an angle calculating unit to calculate, relative to a traveling road, which is estimated for the vehicle to travel, an intersecting angle of an extending direction of a cross road intersecting with the traveling road at an intersection;
an intersecting point retrieving unit to retrieve an arc intersecting point, which is one point found between the cross road and an outer circumference arc of a sector-shaped area by designating the sector-shaped area as centering on the intersection to include the extending direction of the cross road and as having a radius that enables finding of the arc intersecting point; and
a display position determining unit to determine a display position of a road name of the cross road based on a line segment between the intersection and the retrieved arc intersecting point, wherein:
the display position of the string of the plurality of characters of the road name of the cross road is determined to be separated from and in parallel with the line segment between the intersection and the retrieved arc intersecting point; and
the string of the plurality of characters of the road name of the cross road as well as the cross road containing the arc intersecting point is visible in the displayed peripheral road map whereas the line segment between the intersection and the retrieved arc intersecting point is invisible in the displayed peripheral road map.

20. The navigation system according to claim 19, further comprising:
a navigating portion to navigate the vehicle along a guide route which is designated when a destination is specified, wherein
the display managing portion regards as the traveling road the guide route along which the vehicle is being navigated.

21. The navigation system according to claim 20, wherein:
the display managing portion regards, as the traveling road, a road following a road the vehicle runs when the vehicle is not navigated.

* * * * *